(12) United States Patent
Valenzuela et al.

(10) Patent No.: US 7,322,708 B2
(45) Date of Patent: Jan. 29, 2008

(54) MIRROR, OPTICAL IMAGING SYSTEM AND USE THEREOF

(75) Inventors: Carlos Alberto Valenzuela, München (DE); Miriam Noemi Valenzuela, München (DE)

(73) Assignee: Media Lario S.r.l., Bosisio Parini (LC) (IT)

( * ) Notice: Subject to any disclaimer, the term of this patent is extended or adjusted under 35 U.S.C. 154(b) by 0 days.

(21) Appl. No.: 10/496,935

(22) PCT Filed: Nov. 27, 2002

(86) PCT No.: PCT/EP02/13401

§ 371 (c)(1),
(2), (4) Date: Feb. 9, 2005

(87) PCT Pub. No.: WO03/046618

PCT Pub. Date: Jun. 5, 2003

(65) Prior Publication Data

US 2005/0141112 A1 Jun. 30, 2005

(30) Foreign Application Priority Data

Nov. 28, 2001 (DE) ................. 101 58 216

(51) Int. Cl.
*G02B 5/08* (2006.01)
(52) U.S. Cl. ...................................... 359/857; 359/871
(58) Field of Classification Search ................ 359/399, 359/857–859, 871
See application file for complete search history.

(56) References Cited

U.S. PATENT DOCUMENTS

| | | | | |
|---|---|---|---|---|
| 5,047,788 A | * | 9/1991 | Gillard | 343/915 |
| 5,117,606 A | * | 6/1992 | Mikami | 52/738.1 |
| 5,760,979 A | * | 6/1998 | Saito | 359/859 |

* cited by examiner

*Primary Examiner*—Euncha P. Cherry
(74) *Attorney, Agent, or Firm*—The Small Patent Law Group; Dean D. Small

(57) ABSTRACT

The invention relates to a mirror (1), for use in optical imaging systems, whereby the mirror is connected at the edge thereof to a reinforcing element (3), at least partly surrounding the mirror and the reinforcing element also fixes the relative position of the mirror with regard to a further optical element (4). Positioning means (5) are arranged on the reinforcing element, cooperating with positioning means (7), arranged on further optical elements. The optical imaging system in particular concerns a telescope for optical transmission techniques.

26 Claims, 5 Drawing Sheets

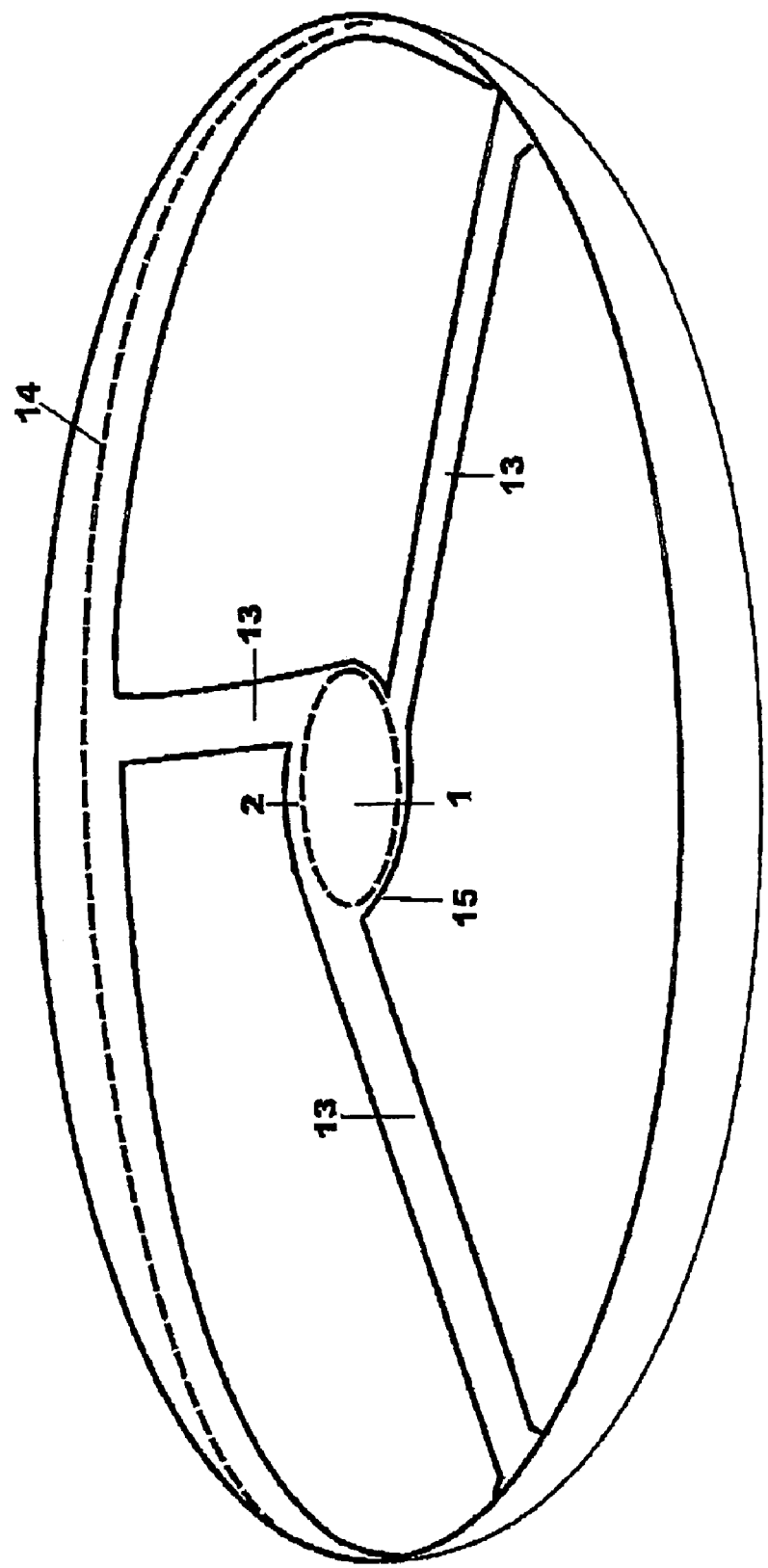

MIRROR, OPTICAL IMAGING SYSTEM AND USE THEREOF

The invention relates to a mirror for use for optical imaging systems, an optical imaging system comprising such a mirror and the use of such mirrors and optical imaging systems.

Mirrors for optical imaging systems have to meet particular quality requirements. A recurrent problem is the deformation of the mirror under mechanical load, as a result of gravitational effects or owing to thermal influences.

In addition, mirrors for optical imaging systems should be light in order to make them universally applicable. The weight problem occurs, for example, in the case of mirrors which are used for telescopes for space applications. However, in the case of optical telecommunication too, light components are desirable in order to permit easy and safe mounting of the components and to keep the static requirements for the fixing points low.

Mirrors having a mirror surface applied by vapor deposition on a substrate are known. Suitable materials for the substrate are, for example, metal and metal alloys, such as aluminium, copper, brass or molybdenum, or nonmetals, such as beryllium. Materials such as, for example, gold, silver, nickel, copper, brass or cadmium, can be used for the mirror surface. The mirror substrates can be produced by turning, in particular diamond turning, by casting, for example from plastic, or by polishing of, for example, glass or Zerodur. Disadvantages of such mirrors are, on the one hand, their high weight if they are to have sufficient mechanical stability and, on the other hand, time-consuming production of the substrate. Each individual mirror has to be produced, for example, by turning or polishing with high precision. The optical accuracy of the mirror is limited by the geometry since not every shape can be produced with high optical accuracy. The optical accuracy is moreover limited by the application of the mirror surface to the substrate by dusting, vapor deposition, spraying or another method, since the required surface quality cannot be directly achieved.

Other known mirrors are those which are produced by replication techniques. Here, in contrast to the above description, the mirror is built up the other way round. The mirror surface is applied in the form of a reflective material to a mandrel and a reinforcing layer is applied thereon. The reinforcing layer can be applied by an electroforming method, by spraying of glass or plastic or by punching. The replication techniques have the advantage that the mirrors have a higher accuracy at smaller material thicknesses and hence have a lower weight. At the same time, however, they are mechanically and therefore optically less robust.

Optical imaging systems which consist of more than one optical element are sensitive with respect to the correct adjustment of the optical elements during assembly. They require considerable skill and experience in assembly in order to keep system errors small.

It is an object of the invention to provide mirrors and optical imaging systems which comprise at least one mirror and which are light and at the same time meet very high optical requirements.

This object is achieved, according to the invention, by a mirror for use for optical imaging systems which is characterized in that it is integrally connected at the edge to a reinforcing element at least partly surrounding the mirror. As a result of the design according to the invention, it is possible to achieve high stability without necessitating a large material thickness of the mirror substrate. The mirror acquires its stability from a reinforcement firmly connected to it at the edge.

The reinforcement may have almost any desired shape. It may completely or partly surround the edge of the mirror. Thus, the mirror can be adapted to its use, for example if it is to be integrated into an optical imaging system and the reinforcing element is not to hinder the positioning of other components, or other components are to be mounted directly on the reinforcing element.

The imaging properties of the mirror are not changed by the reinforcing element according to the invention. At the same time, however, high stability is provided, which permits a thin mirror substrate which has a low weight and does not respond in a critical manner to thermal influences. The reinforcement may be present on the outer edge of the mirror and may additionally or alternatively also be arranged on an inner edge of the mirror if, owing to its use, for example for a telescope, the mirror has a hole.

An embodiment of the invention envisages a reinforcing element which comprises two or more struts and an outer element at which the struts end. For reinforcement of its structure, the mirror can be surrounded by an inner reinforcing element which the struts engage. Alternatively, the struts can serve as an inner reinforcing element even in their engagement regions on the mirror. The struts end on the outside in an element which stabilizes the struts and may serve for fixing the mirror. The outer element may be annular or may have another shape which is tailored to the further components of an optical system in which the mirror is to be used. For increasing their stability, the struts may have a curvature in the longitudinal direction so that they can be designed to be as thin as possible but nevertheless stable.

The struts can preferably run at an acute angle to the plane of the mirror in order to impart particular stability to the arrangement. This results in a three-dimensional object which is similar to a pyramid or a truncated cone. Preferably, the angle between the plane of the mirror and the struts is between 10° and 20°, in particular between 14° and 16°.

Advantageously, the struts engage the mirror not in the radial direction but almost tangentially. This ensures that the mirror is not deformed when forces occur along the struts, for example due to thermal or gravitational influences. Rather, the mirror is slightly rotated in its position, which does not lead to a change in the optical imaging properties in the case of rotationally symmetrical mirrors.

Preferably, the mirror according to the invention is produced by the electroforming method. Other production methods, such as, for example, punching, casting, replication by spraying of glass or plastic, turning, in particular diamond turning, and/or polishing, are, however, also possible in principle.

The stability of the mirror according to the invention can be additionally improved if it has deformations in its mirror surface, such as, for example, beads, edges or arches. The optical imaging properties are disturbed thereby only in small surface regions while the imaging in all other regions is unchanged and is free of shape variations due to deformation as a result of mechanical or thermal influences.

The mirror according to the invention may have in particular a mirror substrate of small thickness. The exact thickness depends on the geometry of the mirror and of the reinforcing element. A mirror substrate of about 0.5 mm thickness for mirrors having a diameter of about 1 m and substrate thicknesses of 0.3 to 0.1 mm for smaller mirrors may be mentioned here as guides for usable substrate thicknesses and exclusively by way of example.

A further achievement of the object according to the invention consists in an optical imaging system comprising a mirror described above and a further optical element. The optical imaging system is characterized in that the reinforcing element simultaneously fixes the position of the mirror and of the further optical element relative to one another, and positioning means which cooperate with the further optical element or with second positioning means arranged thereon are arranged on the reinforcing element. Imaging systems designed in this manner are both light and meet high optical requirements since they can be mounted easily and with high precision and their substantial components have high stability.

For this purpose, the reinforcing element on the mirror can be designed so that it acts as an optical bench and has, at predetermined positions, positioning means which effect exact positioning of the further optical element. The reinforcing element may be, for example, tubular, and it may be in particular cylindrical or conical. The positioning means for positioning the further optical element can be arranged at the end.

The further optical element may be in particular a mirror, a lens or a glass plate having particular optical properties. Such a glass plate may have a crystal structure with particular reflection properties, which has high transmittance in one direction and high reflectance in another direction (semireflective mirror). The glass plate may also contain liquid crystals, such as, for example, cholesteric liquid crystals (CLC) or other polymers which reflect all wavelengths of electromagnetic radiation, with the exception of those light components which are centered about a primary wavelength within a certain wavelength range and/or have a certain direction of rotation of the circular polarization direction.

Depending on the type of optical element, the optical element may cooperate directly with the positioning means of the reinforcing element or may itself have positioning means which cooperate with the positioning means of the reinforcing element. For example, optical elements whose imaging properties do not change on displacement in a plane, i.e. for example plane mirrors or glass plates, may cooperate directly with the positioning means of the reinforcing element. In this case, the reinforcing element need only determine the distance and the angle between mirror and glass plate.

In the case of optical elements whose imaging properties are dependent on the exact position in space, it is advantageous if they have their own positioning means which, together with the positioning means of the reinforcing element of the mirror, define the exact position of the components relative to one another. The positioning means are advantageously integrally connected to the further optical element.

The positioning means are preferably precision surfaces. For example, the edge of a tubular reinforcing element may be in the form of a precision surface and thus define in a highly precise manner the position of a plane mirror which comes to rest at the edge.

If the further optical element likewise has positioning means, these may also be in the form of precision surfaces. For example, a further mirror may have a reinforcing element similar to that of the first mirror, the edge of which is likewise in the form of a precision surface and comes to rest at the edge surface of the first mirror.

In the case of cooperating positioning means, an advantageous embodiment of the invention has shapes of the positioning means which are complementary to one another. Thus, the positioning means may be concave, convex or wedge-like or may taper in another manner in one direction.

In a particularly preferred embodiment, the positioning means are formed in such a way that cavities or gaps form adjacent to their contact points. This permits adhesive bonding, which can be facilitated and improved if the cavities or gaps have dimensions such that they have a capillary action. The element can then initially be exactly positioned. Thereafter, it is possible to apply liquid adhesive which is drawn by the capillary action into the gaps or cavities and produces an extensive adhesive bond.

Preferably, the mirror, the reinforcing element, the further optical element and the positioning means should consist of materials having coefficients of thermal expansion which lie close together, in order to minimize the influence of thermal deformation on the imaging properties of the imaging system. This design can in turn be realized by mirrors produced by the electroforming method and having an integral reinforcing element. The further optical element and/or its positioning means can likewise be produced by this method, so that the entire imaging system or in any case substantial components thereof consist of the same material.

The adhesive used for joining the components or other components used for permanent connection should preferably also have a similar coefficient of thermal expansion.

If, for increasing its stability, the mirror has deformations which impair the imaging properties in this region, these deformations are preferably arranged in a region which is obscured by other components of the imaging system, for example by retaining elements of further components.

According to a working example of the imaging system according to the invention, a focus of the beam path can be arranged in the vicinity of the reinforcing element and/or of the positioning means. For example, so-called skew reflectors have such a beam path. A focus of the beam path is typically used for inputting or outputting light in optical waveguide elements, such as, for example, optical fibres. With the described design according to the invention, it is possible to arrange stable retaining devices for such optical waveguide elements on the reinforcing element. The optical waveguide elements are securely held in their position and it is possible to provide adjusting elements which can be operated without endangering the overall adjustment of the imaging system.

Another particularly advantageous achievement is the arrangement of the second optical element directly in the reinforcing element, for example by one or more reflective, appropriately shaped surfaces provided there.

By a skillful design of the imaging system, it is therefore possible to ensure that the entire system consists of a component which surrounds all imaging elements in one piece. An adjustment of the components relative to one another is not possible but also not required. The components are always optimally positioned relative to one another.

In particular, the optical imaging system according to the invention may be a telescope having not just a single optical axis.

The mirror according to the invention and the optical imaging system according to the invention are preferably used for optical transmission techniques.

The invention is explained in more detail below with reference to the attached figures:

FIG. 2 shows a plan view of a mirror according to the invention having a reinforcing element with struts;

Figure 6:
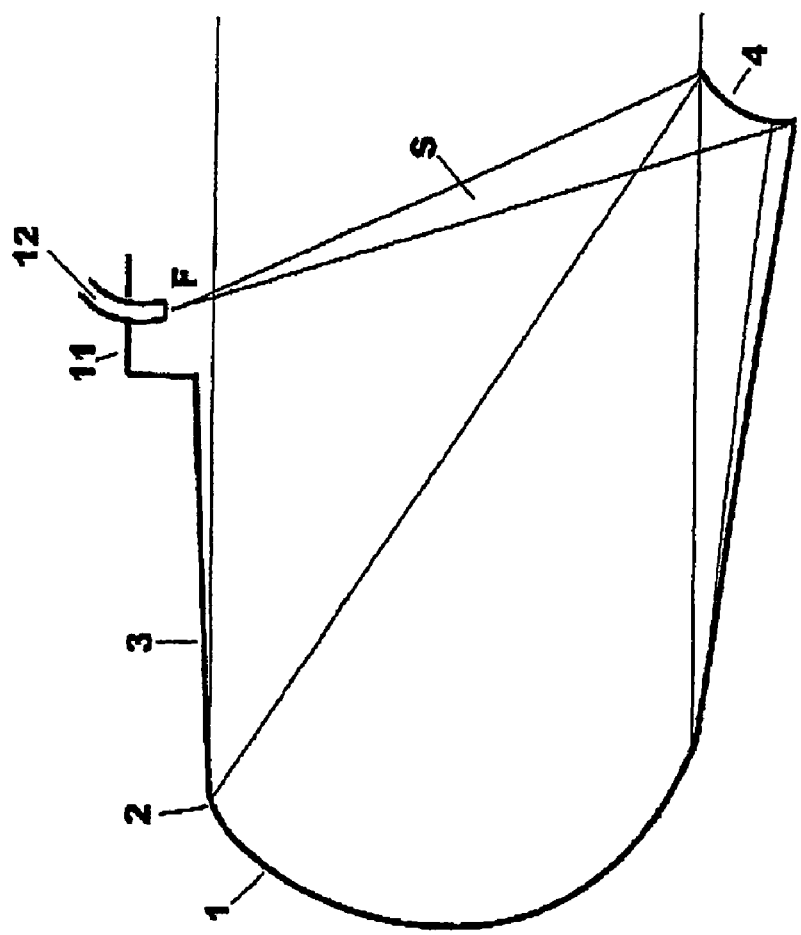
Figure 7:
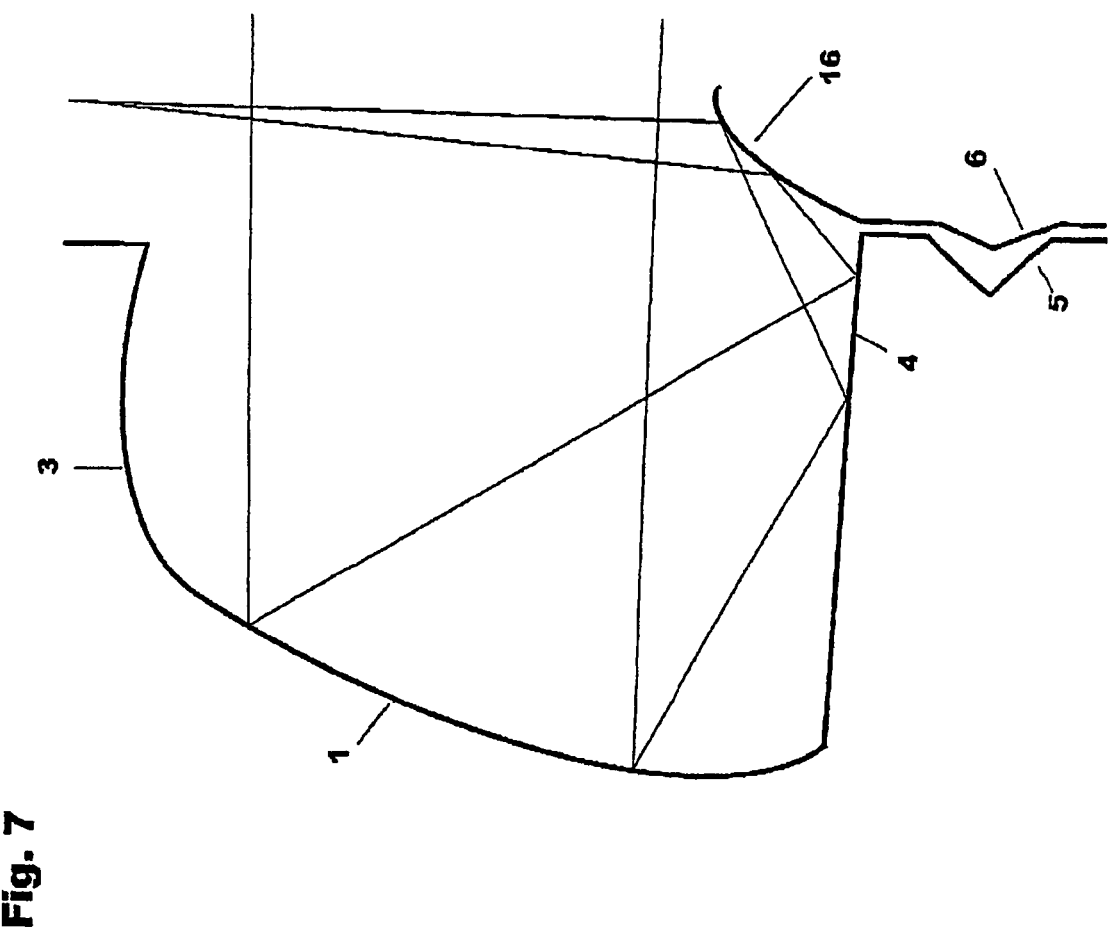

FIG. 5A to C show a longitudinal section of different self-orienting positioning means;

FIG. 6 shows a longitudinal section of an optical imaging system having a second mirror arranged in the reinforcing element;

FIG. 7 shows a longitudinal section of a further optical imaging system.

Figure 1:
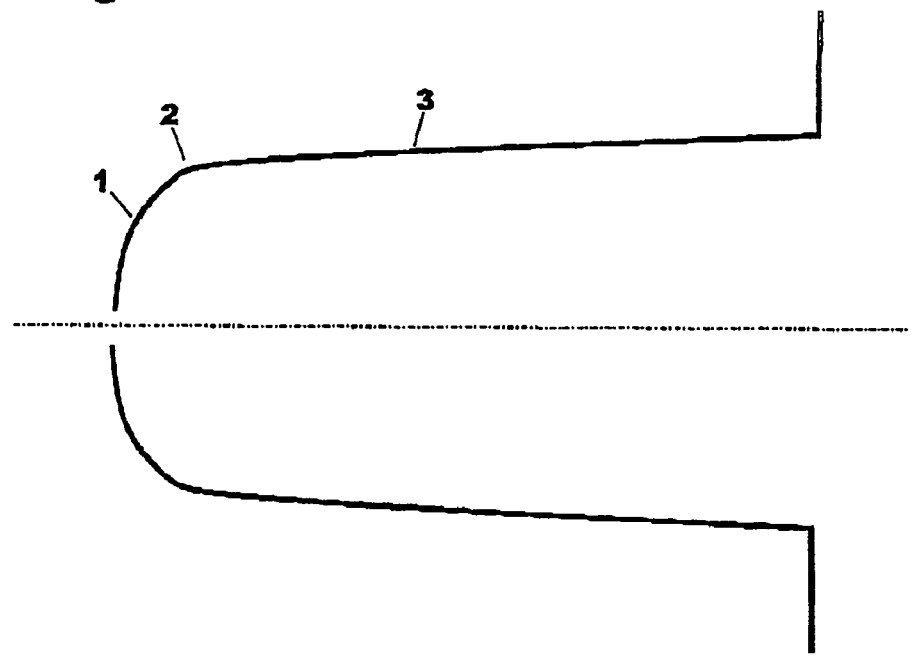
FIG. 1 shows a longitudinal section of a mirror according to the invention having an integrally connected reinforcing element.

The mirror 1 according to the invention, shown in longitudinal section in FIG. 1, is integrally connected at its edge 2 to a reinforcing element 3. The reinforcing element completely surrounds the mirror. The mirror is produced together with the reinforcing element by the electroforming method.

FIG. 2 shows a mirror 1 which is integrally connected at the edge to an inner reinforcing element 15. The inner reinforcing element surrounds the mirror edge 2 completely. Three struts 13 engage the inner reinforcing element and end on the outside in an annular part 14. The struts 13, together with the plane of the mirror, form a three-dimensional object, i.e. the struts are inclined at an acute angle relative to the plane of the mirror. For stability reasons, they are curved parallel to their longitudinal direction. They engage the inner reinforcing element 15 in an approximately tangential direction. Consequently, no forces which result in a deformation or positional change of the mirror act on the mirror 1 under thermal or gravitational influences, but exclusively forces which produce a rotation of the mirror, which results in no change in the imaging properties in the case of a rotationally symmetrical mirror. In addition to stabilizing the struts 13, the outer ring 14 can also serve for exact positioning and/or fixing of the mirror in an optical system, such as, for example, a telescope.

Figure 3:
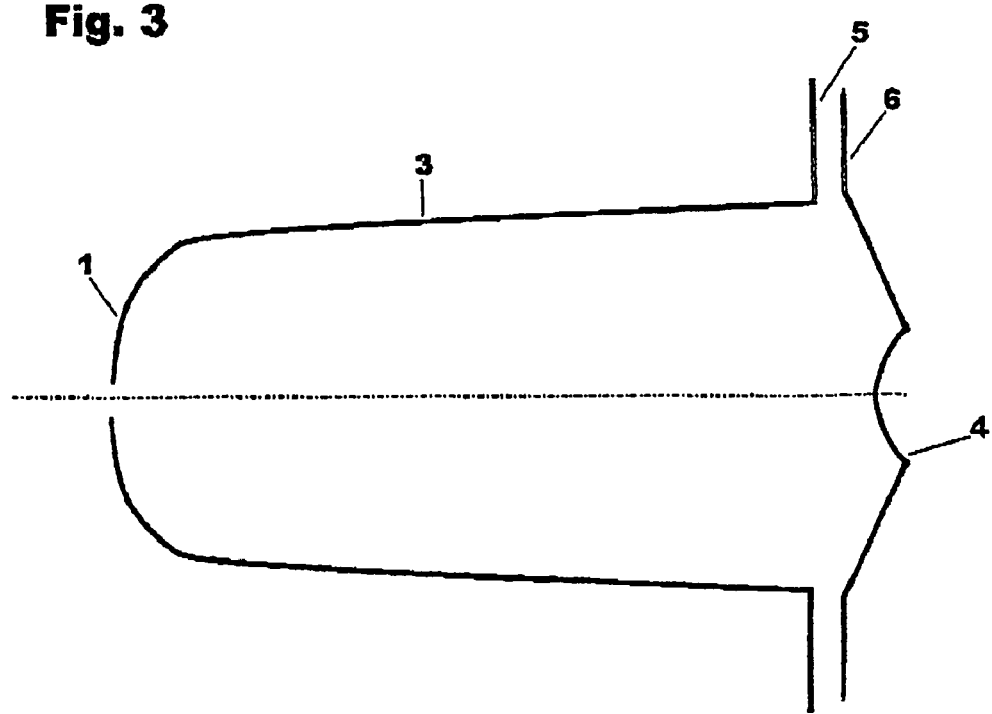
FIG. 3 shows a longitudinal section of an optical imaging system according to the invention.

FIG. 3 shows an example of an optical imaging system according to the invention, namely a telescope. The telescope consists of a primary mirror 1 and a further optical element 4, namely a secondary mirror. The reinforcing element 3 is connected at the edge of the primary mirror and stabilizes it. At the same time, it fixes the position of the primary mirror 1 and of the secondary mirror 4 relative to one another. For positioning the mirrors 1, 4 relative to one another, the reinforcing element 3 has first positioning means 5 which cooperate with second positioning means 6 on the secondary mirror 4. Both components of this telescope are produced by the electroforming method. This makes it possible simultaneously to produce both high-precision mirrors 1, 4 and those surfaces of the positioning means 5, 6 which face one another as precision surfaces in order to achieve highly precise positioning of the mirrors 1, 4 relative to one another. The mirrors of the telescope need be adjusted only in a plane perpendicular to the optical axis. The distance between the mirrors 1, 4 is specified with high precision. In design, the secondary mirror 4 may be a mirror according to FIG. 2.

Figure 4:
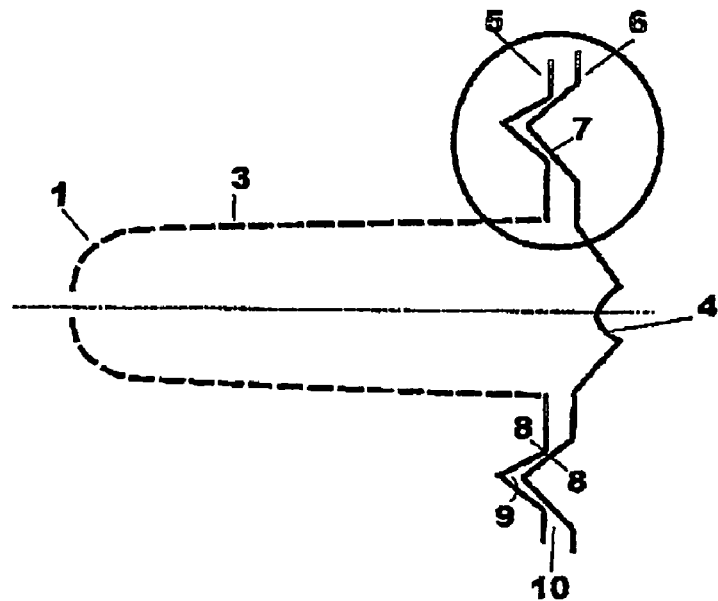
FIG. 4 shows a longitudinal section of an optical imaging system having self-orienting positioning means.

FIG. 4 shows a telescope having basically the same design as in FIG. 3. The positioning means 5,6 are, however, self-adjusting, as shown schematically in the figure. The positioning means 5, 6 have V-shapes 7 complementary to one another. As a result, the secondary mirror 4 is automatically brought into its highly precise predetermined position relative to the primary mirror 1. No adjustment at all is required.

The fixing of the components in the predetermined position can be effected either by means of clamps at the edge of the positioning means 5, 6 or by adhesive bonding. For adhesive bonding, it is advantageous to form the positioning means 5, 6 in such a way that cavities 9 or gaps 10 into which adhesive can be introduced form adjacent to the contact points 8 of the positioning means 5, 6 with one another. This can be achieved, for example as shown in figure, if the positioning means 5, 6 have not exactly complementary shapes but have slightly different angles of their V-shape.

The adhesive effect and the precision of adjustment are increased by virtue of the cavities 9 or gaps 10 having a capillary action. The application of adhesive before the assembly of the elements of the optical system would entail inaccuracies of adjustment due to adhesive residues which penetrate between the touching surfaces of the positioning means 5, 6. It is therefore advantageous to allow the adhesive to penetrate automatically through the capillary action into the cavities and gaps. Reduced contact areas in the case of slightly differently shaped positioning means 5, 6 also prevents an adhesive layer from settling between the positioning means 5, 6 due to imprecise working during assembly. As a result of the small contact areas, any adhesive which has penetrated in between is forced out and is pressed into the adjacent cavities 9 or gaps 10.

Figure 5:
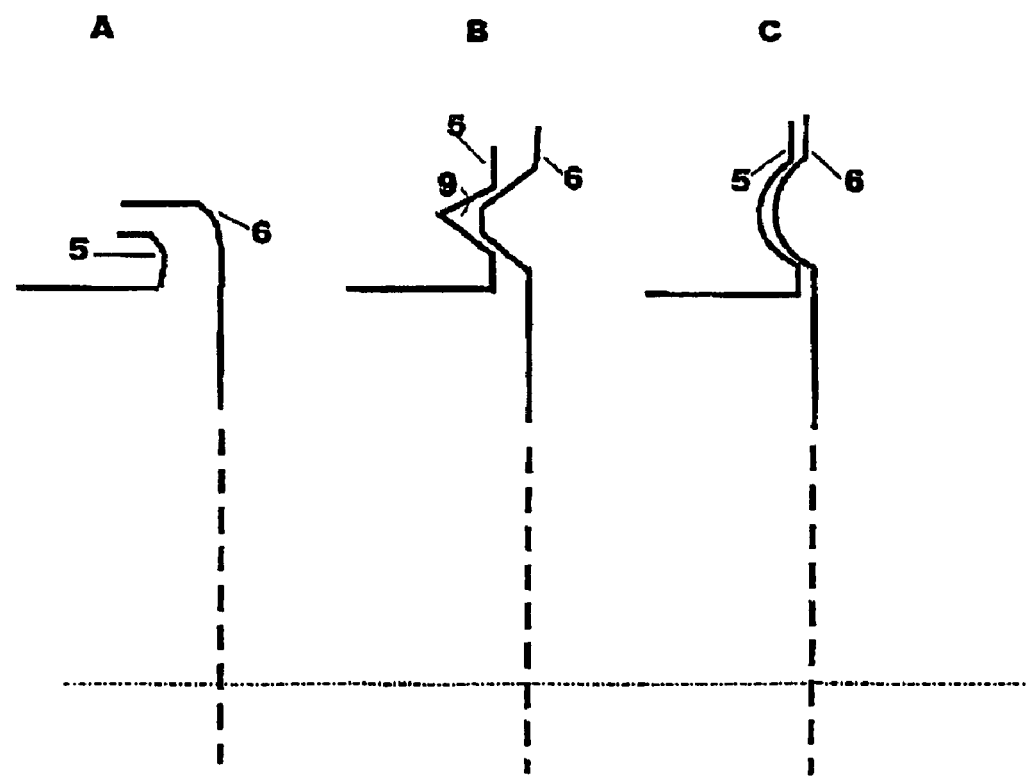

FIG. 5 schematically shows different embodiments of the self-adjusting positioning means 5, 6. The positioning means 5, 6 according to FIG. 5A have bent-over edge regions. The positioning means 5, 6 according to FIG. 5B are V-shaped, the tip of the inner positioning means 6 being capped. As a result, a cavity 9 which serves for receiving adhesive forms between the two positioning means. FIG. 5C shows self-adjusting positioning means 5, 6 having a curvature which is slightly different on the two elements.

FIG. 6 shows an optical imaging system comprising a primary mirror 1 and a reinforcing element 3 surrounding its edge 2, in which imaging system the secondary mirror 4 is arranged in the reinforcing element 3. With suitable shaping, such an off-axis telescope can be produced integrally with high precision by the electroforming method. It need not be adjusted and has no contact surfaces between individual elements which might cause disadjustment and impair the optical properties.

The telescope has, on the reinforcing element 3, a retaining element 11 for input or output elements 12; in the case shown, for a glass fibre for a telecommunication application.

FIG. 7 shows a further optical imaging system, namely a skew reflector telescope, in section. The primary mirror 1 is completely surrounded by a reinforcing element 3 which stabilizes it. A surface in the form of a mirror surface which forms the secondary mirror 4 of the telescope is formed directly in the reinforcing element. Furthermore, a positioning means 5 which serves for positioning the tertiary mirror 16 is mounted on the reinforcing element 3. The primary mirror 1 is produced as one piece together with the reinforcing element 3 and the positioning element 5 by the electroforming method. The tertiary mirror 16 is likewise produced by the electroforming method and has an integrally formed positioning means 6 by means of which it can be positioned, as described above, with high precision relative to the further part of the telescope which comprises the primary mirror and the secondary mirror.

The invention claimed is:

1. Mirror (1) for use for optical imaging systems, wherein the mirror (1) is connected integrally at an edge to a reinforcing element (3) at least partly surrounding the mirror (1), the reinforcing element (3) comprises two or more struts (13) having planes that are one of coincident with and substantially parallel to a plane of an edge (2) of the mirror (1), and at least a portion of each of the struts (13) engaging the edge (2) of the mirror (1) approximately in a tangential direction.

2. Mirror (1) according to claim 1, wherein the reinforcing element (3) completely surrounds the edge (2) of the mirror.

3. Mirror (1) according to claim 1, wherein the reinforcing element (3) comprises an outer element (14) at which the struts (13) end.

4. Mirror (1) according to claim 1 wherein the struts (13) are equidistantly spaced.

5. Mirror (1) according claim 1, wherein mirror (1) and reinforcing element (3) are produced by an electroforming method.

6. Mirror (1) according to claim 1, characterized in that regions of the mirror (1) have deformations of its mirror surface for stabilization.

7. Optical imaging system comprising a mirror (1) according to claim 1 and a further optical element (4), characterized in that the reinforcing element (3) simultaneously fixes the position of the mirror (1) and of the further optical element (4) relative to one another, and positioning means (5) which cooperate with the further optical element (4) are arranged on the reinforcing element (3).

8. Optical imaging system comprising a mirror (1) according to claim 1 and a further optical element (4), characterized in that the reinforcing element (3) simultaneously fixes the position of the mirror (1) and of the further optical element (4) relative to one another, and positioning means (5) which cooperate with positioning means (6) arranged on the further optical element (4) are arranged on the reinforcing element (3).

9. Optical imaging system according to claim 8, characterized in that the further optical element (4) is integrally connected to the positioning means (6).

10. Optical imaging system according to any of claims 7 to 8, characterized in that the further optical element (4) is a mirror or a lens.

11. Optical imaging system according to any of claims 7 to 8, characterized in that the further optical element (4) is displaceable in a plane without changing its optical properties.

12. Optical imaging system according to claim 8, characterized in that the positioning means (5, 6) are precision surfaces.

13. Optical imaging system according to claim 8, characterized in that the positioning means (5,6) have shapes complementary to one another.

14. Optical imaging system according to claim 8, characterized in that the positioning means (5, 6) are formed in such a way that cavities or gaps (10) form adjacent to the contact points (8) of the positioning means (9).

15. Optical imaging system according to claim 14, characterized in that the cavities (9) or gaps (10) have a capillary action.

16. Optical imaging system according to claim 8, characterized in that the mirror (1), the reinforcing element (3), the further optical element (4) and the positioning means (5, 6) consist of materials having coefficients of thermal expansion which are close to one another.

17. Optical imaging system according claim 8, characterized in that the further optical element (4) and/or the positioning means (6) are produced by the electroforming method.

18. Optical imaging system comprising a mirror (1) according to claim 6, characterized in that the deformations of the mirror surface are located at least predominantly in regions which are obscured by other components of the imaging system.

19. Optical imaging system according to claim 8, characterized in that the imaging system is designed in such a way that a focus (F) of the beam path (S) is arranged in the vicinity of the reinforcing element (3) and/or of the positioning means (5, 6).

20. Optical imaging system according to any of claims 7 to 8, characterized in that it is a skew reflector.

21. Optical imaging system comprising a mirror (1) according to claim 1 and a further optical element (4), characterized in that the further optical element (4) is arranged directly on the reinforcing element (3) of the mirror (1).

22. Optical imaging system according to claim 21, characterized in that the further optical element (4) is a mirror which is fanned by one or more reflective surfaces in the reinforcing element (3).

23. Optical imaging system according to any of claims 7 to 8, characterized in that the imaging system is a telescope.

24. Optical imaging system according to claim 8, characterized in that retaining elements (11) for one or more input or output elements (12), in particular for optical waveguides or fibre bundles, are arranged on the reinforcing element (3) and/or on one or more of the positioning means (5, 6).

25. Mirror (1) according to claim 1 configured for optical transmission.

26. Mirror (1) according to claim 1 wherein the struts (13) are curved parallel to a longitudinal axis of the struts.

* * * * *